W. H. ROUGH.
AUTOMATIC WEIGHING MEANS.
APPLICATION FILED OCT. 1, 1908.
924,940.
Patented June 15, 1909.
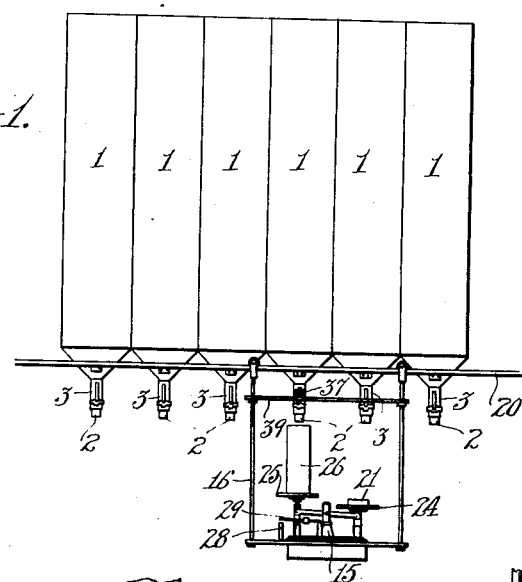
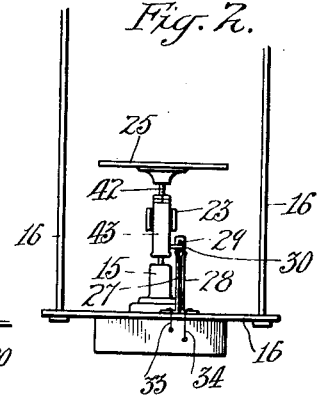
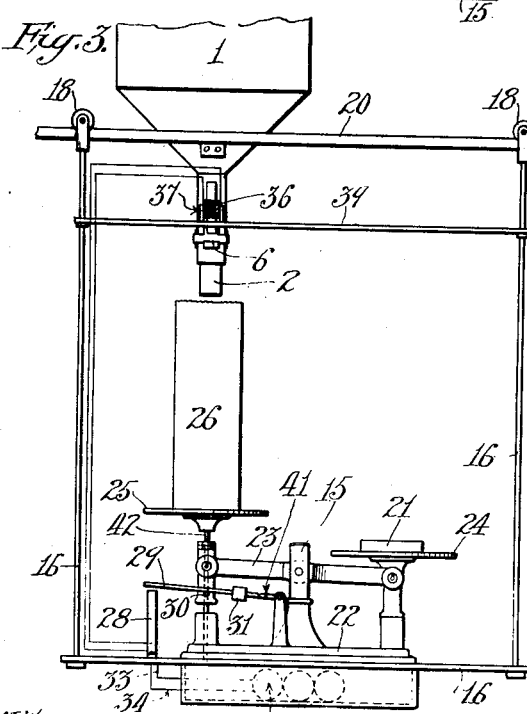
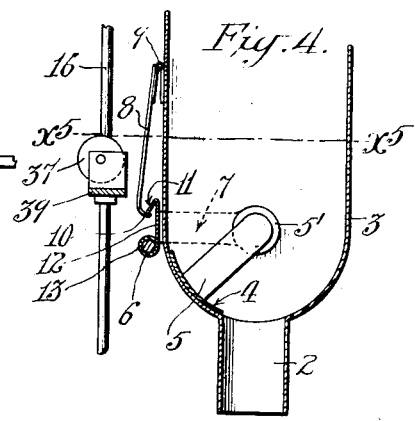
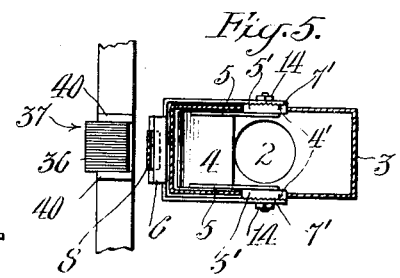
Inventor;
Wilbur H. Rough.

UNITED STATES PATENT OFFICE.

WILBUR H. ROUGH, OF ARLINGTON, CALIFORNIA.

AUTOMATIC WEIGHING MEANS.

No. 924,940.	Specification of Letters Patent.	Patented June 15, 1909.

Application filed October 1, 1908. Serial No. 455,763.

*To all whom it may concern:*

Be it known that I, WILBUR H. ROUGH, a citizen of the United States, residing at Arlington, in the county of Riverside and State of California, have invented a new and useful Automatic Weighing Means, of which the following is a specification.

The main object of the present invention is to provide an automatic weighing scale which will weigh from a plurality of bins by the operation of a single automatic controlling device.

Another object of the invention is to provide, in an automatic weighing scale, means for quickly and conveniently adjusting the scale for use with different material.

Another object of the invention is to provide, in an automatic weighing scale, cut-off or gate means which will eliminate waste at the cut-off.

In the accompanying drawings Figure 1 is a side elevation of a row of bins with the automatic weighing device arranged to coöperate with any one of said bins. Fig. 2 is an end elevation of the weighing device. Fig. 3 is a side elevation of the device on a larger scale. Fig. 4 is a vertical section of the delivery means, the automatic cut-off, and the electro magnetic controlling means therefor. Fig. 5 is a horizontal section on the line $x^5$—$x^5$ in Fig. 4.

Referring to Fig. 1 a plurality or series of bins 1 are supported in any suitable manner so that their delivery spouts or outlets 2 are located in convenient position for delivery to the weighing apparatus, or a receptacle therein, within convenient reach of the operator. Said bins are preferably arranged in a row. Above each spout 2 is provided a pocket or gate-chamber 3 open at the top into the bin and formed with a semi-circular bottom from which the outlet spout 2 extends. The cut-off gate 4 consists of a segmental plate mounted on an arm 5 journaled by trunnions or journals 5' in the sides of the chamber or pocket 3 and provided with a handle 6 connected thereto by a stirrup 7, said handle being on the outside of the case to enable the gate to be manually operated to open the outlet and allow discharge of material from the bin through the outlet. The segment or gate 4 works close to the semi-circular bottom of the chamber 3 so as to effectually close the outlet 2, said gate being entirely within the chamber 2, so that there is no waste or throwing of the material by the operation of the gate.

When the gate is moved to open position shown in full lines in Fig. 3 it is held in that position by a latch or detent 8 pivoted to the wall of the chamber at 9 and having a bent end portion 10 extending under the projection 11 on the cross arm 12 of stirrup 7, said projection 11 being forwardly and downwardly inclined so that in the upward movement of the gate operating means, the said projection will engage with the lower end of latch 8 and move the same outwardly until the said projection passes the latch; whereupon the latch will return by gravity, its lower end passing under the projection 11 to sustain the gate in open position. The bent end 10 of the latch serves in this operation to insure inward movement of the latch 8 if gravity proves insufficient therefor, the stirrup member 7 being formed with a roll 13 at each end which engages with this inclined end portion 10 in the upward movement of the stirrup member to force the latch 8 inwardly. The handle 6 for operating the stirrup member may consist of a round bar extending between the roll portions 13 to form a convenient hand grip. Stirrup member 7 is adjustably connected to gate member 4 by serrated disks 7', 4' respectively on member 7 and on journals 5' of arms 5", so that the angular relation of said members may be adjusted, said disks 7', 4' being clamped by nuts 14.

When the gate has been moved to open position as above described, by this manual operating means, it tends to return to closed position by the weight of the gate of the manual operating means and is held from such return by the latch aforesaid to release said latch and to allow the gate to return to closed position. An automatic controlling means is provided for controlling said latch, responsively to the weight of the material which has passed through the delivery outlet 2. Said means comprises a scale adapted to receive and weigh the material passed from the said outlet, a circuit closer responsive to the condition of balance of said scale, and an electro magnet controlled by said circuit closer and operating the latch 8 to release the same, said latch being of iron or magnetic material to enable its operation by the magnet.

The scale 15, of any suitable construction, is carried by a frame 16 mounted on wheels 18, whereby it is enabled to travel on the track 20 extending longitudinally of the row of bins 1 so that the scale may be brought into operative relation with any one of said bins by running or sliding the frame 16 along said track. The scale shown comprises a base 22 and balance beam 23 and pans 24, 25 respectively for the weighing weight 21 and for the receptacle 26 for receiving the material to be weighed out.

The circuit closer consists of two terminals 27, 28 mounted and insulated on frame 16, and a lever 29 pivoted on the base 22 and adapted to move in a vertical plane into and out of position to bridge across said terminals 27, 28, said lever extending over a projection 30 connected to move with the scale pan 25. A weight 31 is slidably mounted on the lever 29 so as to be adjustable thereon to vary the downward pressure on the projection 30 aforesaid, due to the lever 29. The terminals 27, 28 aforesaid are connected by circuit wires 33, 34 with a battery 35 and with a coil 36 of an electro magnet 37 whose cores 38 are supported on the cross bar 39 of the frame 16 in such position that when the frame 16 is moved to position to bring the receptacle 26 thereon supported, directly beneath the delivery outlet of one of the bins, the pole pieces 40 of the electro magnet 37 will extend directly in front of and adjacent to the latch 8, so that on energization of the electro magnet said latch 8 will be withdrawn from the projection 11 and the gate will move to closed position under the action of gravity. Adjustment of weight 31 on controlling lever 29 is for the purpose of compensating for the difference in materials a series of notches 41 being provided on said lever for holding the weight in different positions corresponding to different materials as sugar, tea, coffee, etc. In this connection it will be understood that the weighing scale takes account only of the material that has actually reached the receptacle and not of any material that is between the gate and the receptacle so that after the closure of the cut-off the material which at the moment of closure is falling from the gate to the receptacle will be added to the receptacle and will tend to give over-weight. This is compensated for by the weight 31 which produces on the scale beam 23 supplementary weight effect sufficient to compensate for the material that was falling to the receptacle from the gate at the moment that the gate is closed. As this weight will be different for different materials, the compensating weight 31 must be adjustable as stated.

The device is used as follows: The operator first moves the weighing scale to that one of the bins which contains the material to be weighed out. The receptacle 26 is placed on the pan 25 and the handle is moved upwardly until the projection 11 is caught by the latch 8, the gate being thus in open position. The material then feeds through outlet 2 into the receptacle 26 until with the aid of the compensating weight 31 sufficient pressure is produced on the scale to balance the weighing weight 21 whereupon the balance beam will assume a horizontal position and the controlling member will come in contact with the terminals 27, 28 closing the electro circuit and causing the electro magnet 37 to release the latch 8, whereupon the gate 4 will move to closed position under the action of gravity. With materials such as sugar, which might flow too freely under a full gate opening, the gate may be adjusted by means 7', 4' so that when the projection 11 is caught by the latch, the gate will be only partly open.

The form of adjustable controlling means shown may be used in connection with a single bin, in which case the track means is omitted.

Pan 25 is adjustable on scale beam 23 by screw support 42, working in a hanger 43, resting on knife edges on the scale beam. By this means the pan may be adjusted to accommodate different sizes of packages.

What I claim is:

1. The combination with a row of bins each having an outlet, a gate for such outlet and an armature for holding the gate in an open position, means for returning the gate to closed position, a weighing scale movable to receive material from any one of the bins, a circuit closer controlled by said scale, a circuit including a source of electric current and connected to said circuit closer, a magnet in said circuit and connected to move with the scale and in position to be brought into coöperative relation with the armature for any bin when the scale is brought to position to receive material from such bin.

2. The combination of a row of bins each provided with an outlet, a gate for the outlet, an armature and latch means for holding the gate in open position, means for returning the gate to closed position, a track, a frame traveling on said track, a weighing scale supported by said frame and movable therewith to be brought into position to receive material from any one of the bins, a circuit controller controlled by said scale, an electric circuit including a source of electric current and controlled by said circuit closer, and an electro magnet carried by said frame and movable therewith into position for coöperative relation with the aforesaid armature, and latch means for any one of the bins when the scale is brought to position to receive material from such bin.

3. The combination of a row of bins, a gate for each bin, an armature controlling the movement of the gate to closed position, a weighing scale movable to position to receive material from any one of the bins, a circuit controlled by said scale, and an electro magnet connected by said circuit and movable with the scale to operate on the armature for the bin at which the scale is placed.

4. In an automatic weighing scale the combination with the scale beam and a member movable therewith, and a circuit closer comprising a lever extending over said member to be raised by the member to open the circuit closer or to be lowered to close the circuit closer, and a weight adjustable on said lever, said lever provided with means for holding the weight in different positions of adjustment.

5. In an automatic weighing means, a bin having an outlet, a gate chamber over said outlet and opening from the bin and having a semi-circular bottom, a gate member consisting of a segmental plate working against the bottom of said gate chamber and moving into position to open or close said outlet, arms journaled in the side of the gate chamber and connected with said gate member, operating means on said gate chamber and connected with said arms, said operating means provided with a handle, with an inclined projection, and a latch hinged to the gate chamber and having an inclined lower end for engaging said latch, said handle having a portion adapted to engage the inclined lower end of said latch in the extreme upward movement of the handle.

6. In an automatic weighing means, a bin having an outlet, a gate chamber over said outlet and opening from the bin and having a semi-circular bottom, a gate member consisting of a segmental plate working against the bottom of said gate chamber and moving into position to open or close said outlet, arms journaled in the side of the gate chamber and connected with said gate member, operating means on said gate chamber and connected with said arms, and an adjustable connection between the said gate carrying arms and the said operating means, for adjusting the angular relation thereof.

In testimony whereof, I have hereunto set my hand at Riverside, California, this 17th day of September 1908.

WILBUR H. ROUGH.

In presence of—
R. E. MacJohnston,
R. L. Cooper.